United States Patent Office 3,579,563
Patented May 18, 1971

3,579,563
PROCESS FOR THE HYDROGENATION OF MIXED NAPHTHALENE ESTERS AND COMPOSITIONS DERIVED THEREFROM
Philip W. Storms, Denver, and Grover L. Farrar, Littleton, Colo., assignors to Marathon Oil Company, Findlay, Ohio
No Drawing. Filed Mar. 2, 1967, Ser. No. 619,950
Int. Cl. C07c 69/76
U.S. Cl. 260—468
12 Claims

ABSTRACT OF THE DISCLOSURE

Hydrogenated derivatives of dimethylnaphthalenes are prepared by
(a) cracking a gas oil to form a light catalytic cycle oil having a boiling range between about 300 to 700° F.,
(b) hydrotreating said light catalytic cycle oil at temperatures of from about 600 to about 800° F. and pressures of from about 200 to about 1000 p.s.i.a. to form a hydrotreated cycle oil,
(c) extracting at least a portion of the aromatics from said hydrotreated cyclic oil,
(d) separating the extracted aromatics from the extracting solvent,
(e) oxidizing the extracted aromatics,
(f) hydrogenating the aromatics.

---

The hydrogenated compounds of the present invention are valuable for a wide variety of purposes including intermediates for the synthesis of other organic compounds, plasticizers for polymeric materials, monomers for the production of polymers, and starting materials for the production of alkyd and other resins. The esters of the present invention are especially preferred for use as plasticizers.

CROSS REFERENCES TO OTHER APPLICATIONS

The present invention is in the same general field as United States application Ser. No. 529,220, Preparation of Hydronaphthalenes filed Feb. 23, 1966 by P. W. Storms and G. L. Farrar, and assigned to the assignee of the present invention.

SUMMARY

Conventional cracking of gas oils to provide light catalytic cycle oils, that is, polynuclear aromatic concentrates as discussed herein, provides a useful source of aromatics for the manufacture of a wide variety of organic compounds. Increased interest in the field of Decalin and Tetralin and their derivatives makes it desirable to manufacture these hydrogenated compounds from aromatics available in light catalytic cycle oils. The available light catalytic cycle oils may be extracted by a variety of processes such as, for example, the process of A. L. Benham, United States application serial number 343,859 filed Feb. 10, 1964, now U.S. Patent 3,317,422 and assigned to the assignee of the present invention. Such extractants provide a relatively pure source of aromatics of a wide variety of types from which particular fractions may be removed by distillation. Dimethylnaphthalenes, the starting materials for Tetralin, Decalin and their derivatives are generally contained in such aromatic extracts and may be separated out by conventional distillation, e.g. of a cut boiling from about 450 to about 550, and more preferably from about 480 to about 525° F.

These dimethylnaphthalenes can be readily oxidized e.g. by chromate oxidation by the techniques of:

L. Friedman, D. L. Fishel and H. Shechter,
J. Org. Chem., 30, 1453–7 (1965). Ohio State Univ.
P. R. Taussig and N. L. Allphin, Jr., Process of Controlled Dichromate Oxidation of Alkylnaphthalenes, U.S. Patent Office Ser. No. 244,252.

or by nitrogen dioxide-selenium process e.g. according to:

H. J. Peterson, A. P. Stuart, and W. D. Vanderwerff, Ind. Eng. Chem., Prod. Res. Develop., 3, (3), 230–3 (1964) Sun Oil, or by other conventional oxidation techniques. The products of such oxidations are the corresponding dicarboxylic acids. These acids, in turn, may be esterified to form esters which are especially useful in the plasticizing of polymers and as starting materials for organic synthesis.

It would seem simple to merely hydrogenate these acids or esters to form the corresponding Decalin and Tetralin derivatives. However, attempts to accomplish this by various hydrogenation techniques have not been successful. The noble metal catalysts, e.g. platinum have failed to accomplish the hydrogenation of these materials to any degree which would be commercially economical. Even sulfur resistant catalysts, such as sulfided nickel-tungsten, do not work with naphthalene diesters produced from light catalytic cycle oils by conventional techniques. Attempts to cause the hydrogenation by use of more severe conditions led to undesirable removal of the ester groups and again failed to produce the Decalin and Tetralin esters in commercially feasible yields.

The present invention embodies the discovery that by hydrotreating the light catalytic cycle oil prior to its oxidation to produce aromatics, hydrogenation to Decalin and Tetralin esters can be readily accomplished. The preferred steps of the present invention therefore, are:

(1) cracking
(2) hydrotreating
(3) extraction
(4) separation of solvent
(5) oxidizing the aromatics
(6) thereafter, hydrogenating.

In most preferred embodiments the aromatics are fractionated prior to the hydrogenation step. Esterification, if desired, should also preferably be conducted prior to hydrogenation.

It should be noted that it is not possible to accomplish the entire hydrogenation prior to the extraction and oxidation steps because it is found that compounds after they have been hydrogenated cannot be extracted according to the usual methods for extraction of aromatics. Further, the hydrogenation cannot be done satisfactorily prior to the oxidation step because the oxidation of the hydrogenated compound proceeds at a substantially uncontrollable rate and generally the side chains will be undesirably removed by total oxidation and in addition, the rings may themselves be attacked.

DESCRIPTION OF THE PREFERRED EMBODIMENTS

Polynuclear aromatic concentrates are obtained by catalytically cracking a petroleum fraction of the type generally referred to as "gas-oil" which is in turn obtained from a crude distillation unit (using the highest boiling distillate fraction) or from a coker or elsewhere in the refinery process. These "gas oils" are conventionally catalytically cracked and the product boiling in the general range of from about 300 to about 700° F. (preferably from about 360 to about 650° F.) is extracted by liquid-liquid contact with a solvent suitable for the removal of aromatics, e.g. according to the process of the aforementioned United States patent application to A. L. Benham. The selective solvent is then removed by distillation or by other conventional stripping technique and the aromatic extract is recovered. This extract consists primarily of polynuclear compounds principally alkyl-naphthalenes with indenes, tetralins, and with less than about 15% alkylbenzenes.

The hydrotreating step of the present invention proceeds conventionally as discussed previously. In most cases, the hydrotreating tends to hydrogenate olefinic double bonds particularly in diolefins but does not substantially affect the aromaticity.

Likewise, the extraction of aromatics proceeds conventionally as mentioned above. It should be noted that the hydrotreating step can occur either before or after the extraction, but must in all cases occur prior to any substantial oxidation of the stream.

As mentioned above, the oxidation can be by the well known chromate method, or by any other variety of the conventional methods. As usual, the oxidation will be cut off at a point sufficient to provide a maximum yield of the desired oxidized products with a minimized destruction of rings by excessive oxidation.

The esterification step utilized when esters are the desired products, is accomplished by the use of the standard techniques for the reaction of the organic acids with hydroxyl-containing compounds and no novel methods are necessary. In general, it will be preferred to conduct the esterification at a temperature of from about 25° C. to about 300° C. with approximately stoichiometric quantities of the organic acids and organic hydroxyl-containing compounds being present in the reaction mixture. Catalysts will generally be employed to enhance the particular reaction being conducted. They will preferably be of the acid type, such as sulfuric acid, but may be of the oxide type, such as thorium, titanium, or antimony. Any of the hydroxyl-containing organic compounds, or mixtures of such compounds, which are known to undergo esterification may be utilized but the preferred of such compounds will contain from about 1 to about 20 and, more preferably from 1 to about 10, and most preferably from 1 to about 4 carbon atoms. The most preferred hydroxyl-containing compounds for use in the esterification step are methanol, ethanol, propanol, and butanol.

The hydrogenation step of the present invention is not conducted in any particularly novel manner and the well known techniques of the art of hydrogenation are generally applicable to the conducting of this step of the present invention. It is important for the present invention that the hydrogenation step be conducted subsequent to any step involving substantial oxidation. The hydrogenation step preferably would be conducted under pressure of from about 10 to about 10,000 p.s.i.g., with pressures of 500 to 5,000 being more preferred, and pressures of 1,000 to about 3,000 being most preferred. Temperatures of the hydrogenation step will generally be from about 50° C. to about 400° C. with temperatures of from about 100 to about 300 being more preferred and temperatures of from about 150 to about 200 being most preferred.

Because esterification sometimes enhances hydrogenation, the hydrogenation step will preferably (but not absolutely necessarily) be conducted subsequent to any esterification step. It is essential to the process of the present invention that the hydrogenation step be conducted subsequent to any step which involves substantial oxidation.

While the above discussions, and the examples which follow, are conducted primarily on the mixed naphthalenes derived from light catalytic cycle oil by the above described extractions, it should be understood that while mixed feed streams are preferred for economic reasons, pure compounds may be substituted. Also, while di-methylnaphthalenes are most preferred other alkyl substituted polynuclear compounds, especially those containing from about 1 to about 6, and most preferably from 1 to about 3, carbon atoms in the alkyl groups are suitable. Other polycyclic nuclei may, of course, be utilized and while two alkyl groups per molecule are most preferred, any number of alkyl groups may be substituted into the molecule of the starting materials utilized in the invention.

The following examples will serve to better explain the invention, however, it should be understood that they are merely illustrative and that all of the modifications and variations which will be obvious to those skilled in the art from a reading of the present specification, should be included in the spirit of the claims appended hereto.

EXAMPLE I

Mixed naphthalene dimethyl esters (20 parts) from non-hydrotreated catalytically cracked gas oil extract, cyclohexane (120 parts) and nickel-tungsten sulfide (1 part) were mixed in an autoclave and heated to 275° C. under 2800 p.s.i.g. hydrogen pressure. No hydrogen uptake was observed and the naphthalene esters were recovered unchanged.

EXAMPLE II

Following the method of Example I, mixed naphthalene dimethyl esters (30 parts), cyclohexane (120 parts) and 10% palladium-on-charcoal (5 parts) were heated to 175° C. in an autoclave under 3000 p.s.i.g. hydrogen pressure. No reaction was observed except that the sulfur content of the starting material was reduced from 1.2 to 0.9%. A second hydrogenation of the recovered material reduced the sulfur content to 0.5%, but again no saturation of double bonds occurred.

EXAMPLE III

According to the present invention, mixed naphthalene dimethyl esters (10 parts) containing 0.10–0.04% sulfur from hydrotreated catalytically cracked gas oil, cyclohexane (120 parts) and 5% ruthenium-on-carbon (1 part) were heated to 150° C. and hydrogenated under 1500 p.s.i.g. pressure. The colorless product containing no sulfur was recovered by filtration and evaporation of solvent. It was found to be a mixture of Tetralin dimethyl esters. This Example as compared to Examples I and II shows the importance of use of hydrotreated feed material.

EXAMPLE IV

According to the present invention, mixed naphthalene dimethyl esters (20 parts) as from Example III, cyclohexane (120 parts) and 5% palladium-on-charcoal (1 part) were heated in an autoclave at 200° C. under 2000 p.s.i.g. hydrogen pressure. The colorless product was recovered as in Example III and determined to be a mixture of Tetralin dimethyl esters.

EXAMPLE V

The product (10 parts) from Example IV was hydrogenated again by the method described in Example IV. The resulting water-white product was determined to be a mixture of Decalin dimethyl esters.

EXAMPLE VI

According to the present invention, mixed naphthalene dibutyl esters (20 parts) derived from hydrotreated catalytically cracked gas oil, methanol (120 parts) and 5% palladium-on-carbon (1 part) are heated to 150° C. and hydrogenated under 1500 p.s.i.g. hydrogen pressure. The colorless product is recovered by evaporation of methanol solvent and found to be a mixture of Tetralin dibutyl esters.

EXAMPLE VII

According to the present invention, methyl esters of mixed aromatic acids (20 parts) obtained from the full boiling range material extracted from hydrotreated catalytically cracked gas oil, methanol (120 parts) and 5% palladium-on-charcoal (1 part) are hydrogenated under 2000 p.s.i.g. hydrogen pressure at 175° C. The product is a mixture of Tetralin esters, benzene esters, biphenyl esters, cyclohexyl esters and others.

We claim:

1. A process for the preparation of hydrogenated derivatives of dimethyl naphthalenes comprising in combination the steps of:
    (a) cracking a gas oil to form a light catalytic cycle oil having a boiling range between about 300 to 700° F.,
    (b) hydrotreating said light catalytic cycle oil at temperatures of from about 600 to about 800° F. and pressures of from about 200 to about 1000 p.s.i.a. to form a hydrotreated cycle oil,
    (c) extracting at least a portion of the aromatics from said hydrotreated cycle oil,
    (d) separating the extracted aromatics from the extracting solvent,
    (e) oxidizing the extracted aromatics,
    (f) hydrogenating the oxidized aromatics.

2. The process of claim 1 wherein the aromatics from said extraction process are distilled to obtain at least one fraction boiling between about 450 to about 550° F.

3. The process of claim 2 wherein said fraction comprises a principal portion of dimethylnaphthalenes.

4. The process of claim 3 wherein at least a portion of said dimethylnaphthalenes are oxidized to form dicarboxylic acids.

5. The process of claim 4 wherein said dicarboxylic acids are esterified with an alcohol containing 1 to about 20 carbon atoms.

6. The process of claim 5 wherein the alcohol containing 1 to about 20 carbon atoms is a monohydric alcohol.

7. The process of claim 6 wherein the monohydric alcohol contains from 1 to about 10 carbon atoms.

8. The process of claim 7 wherein the alcohol is methanol.

9. The process of claim 7 wherein the alcohol is ethanol.

10. The process of claim 7 wherein the alcohol is propanol.

11. The process of claim 5 wherein the esters are thereafter hydrogenated by contacting with hydrogen at a temperature of from about 150° C. to about 200° C. at a pressure of from about 1000 p.s.i.g. to about 3000 p.s.i.g. in the presence of a hydrogenation catalyst.

12. In a process for the preparation of Decalin or Tetralin esters by oxidation and subsequent esterification of aromatic extract comprising dimethyl naphthalenes, the improvement consisting essentially of, in combination:
    (a) hydrotreating of said aromatic extract prior to said oxidation at between about 600 to 800° F. and about 200 to 1000 p.s.i.a. to remove olefins without substantially affecting the aromaticity and
    (b) hydrogenating to substantially eliminate said aromaticity subsequent to said oxidation wherein said aromatic extract is derived by cracking a gas oil and extracting a cracked fraction boiling in the range of 300° to 700° F.

References Cited
UNITED STATES PATENTS
3,256,353  6/1966  Shuman et al. _____ 260—667

LORRAINE A. WEINBERGER, Primary Examiner

P. J. KILLOS, Assistant Examiner

U.S. Cl. X.R.

260—468, 475, 514, 515, 524, 667

UNITED STATES PATENT OFFICE
CERTIFICATE OF CORRECTION

Patent No. 3,579,563          Dated May 18, 1971

Inventor(s) P. W. Storms & G. L. Farrar

It is certified that error appears in the above-identified patent and that said Letters Patent are hereby corrected as shown below:

Col. 4, line 38:   "0.10" should read --0.01--

Signed and sealed this 21st day of December 1971.

(SEAL)
Attest:

EDWARD M. FLETCHER, JR.
Attesting Officer

ROBERT GOTTSCHALK
Acting Commissioner of Patents